(12) United States Patent
Kowol

(10) Patent No.: US 11,543,048 B2
(45) Date of Patent: Jan. 3, 2023

(54) VALVE, FITTING AND USE OF A VALVE

(71) Applicant: Neoperl GmbH, Mullheim (DE)

(72) Inventor: Jacek Kowol, Gundelfingen (DE)

(73) Assignee: Neoperl GmbH, Müllheim (DE)

( * ) Notice: Subject to any disclaimer, the term of this patent is extended or adjusted under 35 U.S.C. 154(b) by 0 days.

(21) Appl. No.: 16/972,314

(22) PCT Filed: May 29, 2019

(86) PCT No.: PCT/EP2019/064099
§ 371 (c)(1),
(2) Date: Dec. 4, 2020

(87) PCT Pub. No.: WO2020/007543
PCT Pub. Date: Jan. 9, 2020

(65) Prior Publication Data
US 2021/0246997 A1    Aug. 12, 2021

(30) Foreign Application Priority Data

Jul. 3, 2018   (DE) .......................... 202018103806.0
Aug. 9, 2018  (DE) .......................... 202018104600.4

(51) Int. Cl.
*F16K 31/524* (2006.01)
*F16K 27/02* (2006.01)

(52) U.S. Cl.
CPC .... *F16K 31/52491* (2013.01); *F16K 27/0236* (2013.01)

(58) Field of Classification Search
None
See application file for complete search history.

(56) References Cited

U.S. PATENT DOCUMENTS

| | | | | |
|---|---|---|---|---|
| 3,807,455 A | * | 4/1974 | Farrell | ...................... F16K 3/08 137/454.6 |
| 7,798,172 B2 | * | 9/2010 | Leutwyler | ............. F16K 27/045 137/801 |
| 8,857,460 B2 | * | 10/2014 | Hahn | ................... F16K 27/0236 137/315.13 |
| D920,477 S | * | 5/2021 | Bian | ......................... F16K 1/00 D23/233 |
| 2006/0096642 A1 | | 5/2006 | Matsui et al. | |
| 2018/0031141 A1 | | 2/2018 | Ye et al. | |
| 2019/0383402 A1 | | 12/2019 | Tempel | |

FOREIGN PATENT DOCUMENTS

| | | | |
|---|---|---|---|
| CN | 203230877 | | 10/2013 |
| CN | 203656296 | | 6/2014 |
| CN | 203948677 | | 11/2014 |
| CN | 1060512208 A | * | 10/2016 |

(Continued)

OTHER PUBLICATIONS

WO-2014076242-A1, machine Translation (Year: 2014).*
CN-1060512208-A, machine translation (Year: 2016).*

*Primary Examiner* — Daphne M Barry
(74) *Attorney, Agent, or Firm* — Volpe Koenig

(57) ABSTRACT

In a sanitary valve (1) having a push-push actuation mechanism (2), a cap interface (5) is provided between a cover cap (6) and an actuating element (3) having a higher rotational symmetry than a fitting interface (8) between the valve (1) and a fitting (9).

18 Claims, 16 Drawing Sheets

(56) References Cited

FOREIGN PATENT DOCUMENTS

| | | | | |
|---|---|---|---|---|
| CN | 106352110 | | 1/2017 | |
| CN | 206257284 | U * | 6/2017 | |
| DE | 202016001106 | | 6/2017 | |
| DE | 202017101403 | | 6/2018 | |
| DE | 102017115191 | | 1/2019 | |
| WO | WO-2014076242 | A1 * | 5/2014 | ......... F16K 31/3855 |

* cited by examiner

Fig. 6
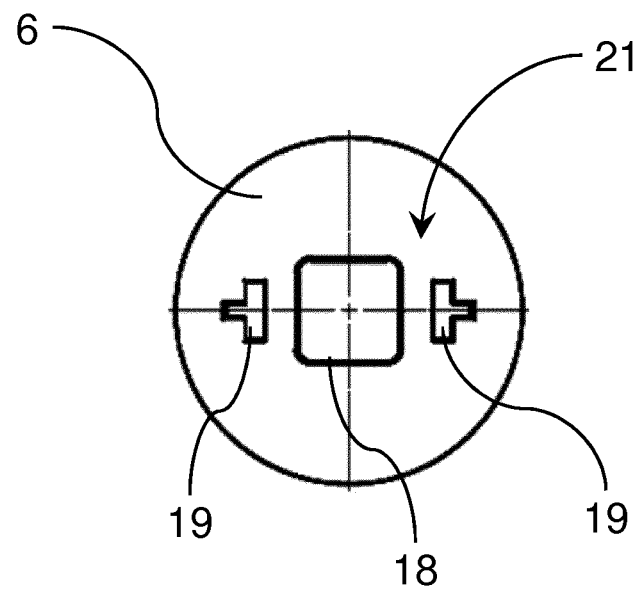
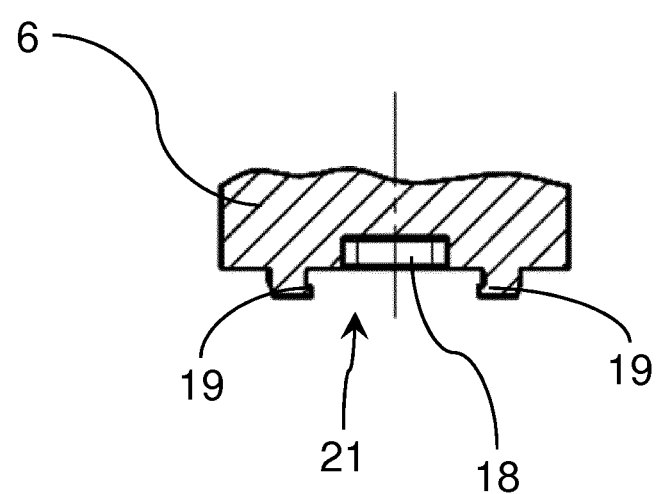
Fig. 7

Fig. 11
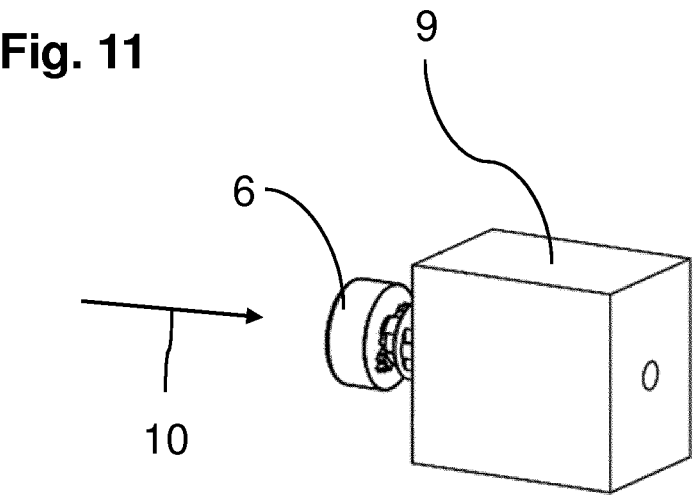
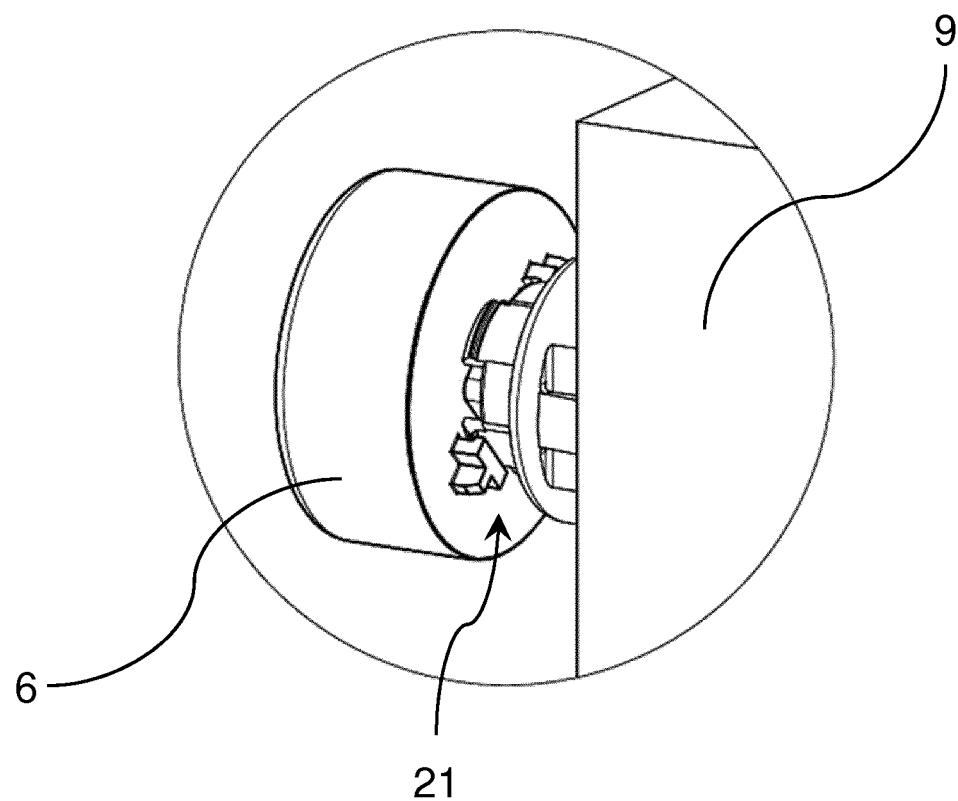
Fig. 12

VALVE, FITTING AND USE OF A VALVE

TECHNICAL FIELD

The invention relates to a valve having a push-push actuation mechanism which has an actuation element which, at its free end, forms a cap interface for a covering cap, wherein the valve has a main body which defines a fitting interface for a fitting, wherein the actuation element is guided in a manner rotationally fixed relative to the main body and so as to be displaceable in an actuation direction.

BACKGROUND

Such valves are known, and are used for example as changeover means or as shut-off valves. Such valves are frequently equipped with a switching diaphragm, which is able to be acted on by the working pressure of a switched liquid, wherein the push-push actuation mechanism, for switching the switching diaphragm, actuates a pilot valve which predefines the action on the switching diaphragm. Here, the push-push actuation mechanism can assume at least two switching states, and it has also been proposed to realize more than two switching states, which are realized, upon actuation, in a successive manner, for example for intermediate positions of the valve.

Since the push-push actuation mechanism requires no rotatable actuation element, it is possible for a covering cap to be provided with printing, wherein a selected spatial orientation of the printing is maintained during an actuation process. However, the realization of the correct orientation requires increased concentration during the assembly of the fitting, so as to avoid incorrect joining-together of the individual parts.

The invention also relates to a fitting and to a use of a valve at a fitting.

SUMMARY

The invention is based on the object of simplifying the production of a fitting.

For the purpose of achieving the object, one or more features are provided according to the invention. In particular, it is thus provided according to the invention, for the purpose of achieving the object in the case of a valve of the type mentioned in the introduction, that the cap interface is formed such that a covering cap is able to be connected in n orientations, that the fitting interface is formed such that the main body is able to be inserted into a fitting in m orientations, and in that n≥m ("n is greater than or equal to m", n>=m), in particular n>m ("n is greater than m"), holds. Here, it is an advantage that a large number of orientations in which the covering cap is able to be mounted onto the actuation element is achievable without this having to entail an increased outlay in terms of machining at the fitting. An outlay in terms of machining when machining the fitting to form a fitting counterpart interface, which is able to be and is connected to the fitting interface, is consequently able to be kept low. The comparatively large number of orientations in which the covering cap is able to be mounted allows simple error correction and high flexibility for covering different installation situations.

A further advantage which is achievable by way of a configuration according to the invention is enhanced freedom of design at a front, that is to say for example a side facing away from the valve, of the covering cap. Here, the front may be formed in practically any desired manner, for example to be round, to be polygonal, with a freeform configuration, with a thread or other fastening devices. Here, the invention makes it possible for this to be achieved with a standardized valve.

The cap interface may have for example a peripheral contour which is connected in a form-fitting manner to a matching, complementarily formed cap counterpart interface on a covering cap. It is consequently possible to provide for rotationally fixed fastening of the covering cap to the valve. Here, the peripheral contour may be formed for example as an inner contour or outer contour which interacts with the covering cap.

Alternatively or additionally, it may be provided that the fitting interface has a peripheral contour which is connected in a form-fitting manner to a matching, complementarily formed fitting counterpart interface on the main body. The valve is consequently able to be fastened to the fitting in a rotationally fixed manner.

In one configuration of the invention, it may be provided that the cap interface has rotational symmetry of order n. The formation of a discrete rotational symmetry at the cap interface is a simple way for being able to define the described orientations in which the covering cap is able to be connected.

Alternatively or additionally, it may be provided that the fitting interface has rotational symmetry of order m. The formation of a discrete rotational symmetry at the fitting interface is a simple wat for being able to define the described orientations in which the valve is able to be inserted into the fitting.

In one configuration of the invention, it may be provided that the cap interface has an n-gonal peripheral contour. It is possible for n-gonal, in particular regular, peripheral contours, for example triangular, square, rectangular, pentagonal, hexagonal, octagonal peripheral contours, to be provided with low production outlay, for example by injection molding techniques.

It is accordingly or generally expedient for the actuation element to be produced from plastic.

In one configuration of the invention, it may be provided that n is a number divisible by four. Simple orientation of the covering cap is thus achievable at least in each of the four spatial orientations in which the fitting can be operated.

In one configuration of the invention, it may be provided that the fitting interface has a positioning element by way of which it is able to be inserted into a correspondingly shaped valve receptacle of a fitting in exactly one orientation. Here, it is an advantage that only a few machining steps, for example machine-milling of a counterpart element, for example a groove, for receiving the positioning element, for example a rib or tongue, are required for a rotationally fixed connection.

In one configuration of the invention, it may be provided that the cap interface is configured for forming a snap-action and/or latching connection. In this way, an easily fittable and/or detachable connection between the covering cap and the actuation element is able to be established. The detachability may be used for example to allow correction of an incorrect orientation of the covering cap in the fitted state.

In one configuration of the invention, it may be provided that a means for a snap-action and/or latching connection is, in a plugging-on direction, arranged beyond a means for rotationally fixed guidance. It is thus able to be achieved that an orientation of the covering cap is fixed first before the snap-action and/or latching connection firmly, in particular detachably, connects the covering cap to the actuation element. The plugging-on direction may be defined for example by the covering cap. In this case, it may be provided that at least one latching lug is formed, for example on a spring element. In this way, elasticity in the material is able to be provided to an adequate extent so as to allow engagement with snap-in action of the snap-action and/or latching connection. Preferably, n latching lugs are provided, or the number of latching lugs is a proper divisor of n. Alternatively or additionally, it may be provided that a latching undercut is formed, for example on the covering cap. It is particularly expedient if the arrangement and/or configuration of the latching undercut(s) likewise has rotational symmetry of order n.

In one configuration of the invention, it may be provided that a thread is formed on the actuation element. It is consequently possible for detachable fastening of the covering cap to be produced via a screw connection. In this case, the thread may be arranged for example ahead of the cap interface in a plugging-on direction. This allows simple fastening of the covering cap by way of a counterpart thread, for example on a screw or nut. The thread may be formed for example on a threaded bolt. This makes it possible for the covering cap to be mounted onto the threaded bolt and then secured by a nut. A cover may be provided to conceal the nut or a screw.

In one configuration of the invention, it may be provided that, on the main body, a fastening element is configured for fastening to a fitting and is arranged so as to be movable relative to the main body. Here, it is an advantage that the main body—by contrast for example to a thread formed thereon—does not need to be rotated from the defined orientation for the purpose of fastening the valve to the fitting. In one simple case in terms of construction, the fastening element may for example be a fastening nut.

For the purpose of achieving the object in the case of a fitting, the features directed at a fitting are provided according to the invention. In particular, it is thus proposed according to the invention, in the case of a fitting with a covering cap and a valve according to the invention, in particular as claimed in one of the claims directed at a valve and/or as described above, that the covering cap has a cap counterpart interface which is configured for matching the cap interface, in particular matching said cap interface geometrically and/or in a form-fitting manner. It is thus easily able to be achieved that the covering cap is able to be fitted in n orientations, that is to say for example orientations with respect to an axis of rotation about which the covering cap is able to be rotated.

Here, the covering cap may be formed in one part, in particular as described already and/or further below, or in multiple parts, for example having a cap base piece, a nut and a cover, in particular as described further below.

Alternatively or additionally, it may be provided according to the invention, for the purpose of achieving the object in the case of a fitting with a covering cap and a valve according to the invention, in particular as claimed in one of the claims directed at a valve and/or as described above, that the fitting has a fitting counterpart interface which is configured for matching the fitting interface. A covering cap is thus able to be easily fitted to a fitting in a rotationally fixed manner in different orientations.

In one configuration of the invention, it may be provided that the fitting is produced from metal. Here, it is an advantage that avoidable, relatively complex machining steps at the metal of the fitting, for example for forming rotational symmetry of high order, are able to be avoided.

Alternatively or additionally, in one configuration of the invention, it may be provided that the covering cap is produced from plastic. The invention thus makes use of the fact that rotational symmetry of relatively high order is easily achievable for a plastic part, in particular in the case of an injection-molded part. Alternatively or additionally, for example in the case of a multi-component design, the covering cap may be produced from plastic.

In one configuration of the invention, it may be provided that the fitting interface is formed without a thread. Here, it is an advantage that the main body is able to be inserted into the valve receptacle while maintaining its orientation.

In one configuration of the invention, it may be provided that the main body has a cylindrical basic shape at least in the region of the fitting interface. Here, it is an advantage that the main body is able to be formed to be compatible with all discrete rotational symmetries of the fitting interface.

In one configuration of the invention, it may be provided that the fitting has a valve receptacle into which the main body of the valve is inserted. The valve receptacle may be machine-milled, in particular for forming the fitting counterpart interface already mentioned. Since the machine-milling steps are particularly complex in terms of manufacturing technology, use may be made of reduced rotational symmetry at the fitting for the purpose of reducing the outlay in terms of manufacturing technology. For example, the main body may be inserted into the valve receptacle in a rotationally fixed manner. Here, it is an advantage that the orientation with which the valve is inserted into the fitting is maintained.

For the purpose of achieving the object in the case of a use of a valve, the features directed at a use are provided according to the invention. In particular, it is thus provided, in the case of the use of a valve according to the invention, in particular as claimed in one of the claims directed at a valve, at a fitting according to the invention, in particular as claimed in one of the claims directed at a fitting, that the valve is inserted into the fitting in an orientation of the main body, and a covering cap is mounted onto the actuation element in an orientation of the cap. It is thus easily possible to realize matching of the orientation of the covering cap relative to the fitting. The reduced rotational symmetry at the fitting in relation to the covering cap saves manufacturing outlay in the machining, for example turning machining, of a valve receptacle of the fitting, in particular of the valve receptacle already mentioned and/or described in more detail below.

The orientation may, for example, be defined or marked with respect to printing on the covering cap. It is thus possible for a covering cap with printing to be fitted on the actuation element in a desired orientation.

In one configuration of the invention, it may be provided that the orientation of the cap is selected such that the covering cap has a desired spatial orientation in a position of use. Printing on the covering cap can thus be easy to read.

Alternatively or additionally, in one configuration of the invention, it may be provided that the orientation of the main body is selected such that the covering cap has a desired spatial orientation in a position of use. It is thus easily possible to form an external shaping and/or contouring and/or printing and/or coloring or some other marking for an observer in a desired orientation.

BRIEF DESCRIPTION OF THE DRAWINGS

The invention will now be described in more detail on the basis of an exemplary embodiment, but is not restricted to this exemplary embodiment. Further exemplary embodiments will emerge from combination of the features of individual or several dependent claims with one another and/or with individual or several features of the exemplary embodiment.

In the figures:

FIG. 6 shows a view of the covering cap from FIG. 1 from below, FIG. 7 shows an axial sectional illustration through the covering cap as per FIG. 1, FIG. 11 shows the arrangement as per FIG. 10 from another considered position, FIG. 12 shows an enlargement from FIG. 11.

DETAILED DESCRIPTION

FIGS. 1 to 14 will be described together in the following text.

Figure 1:
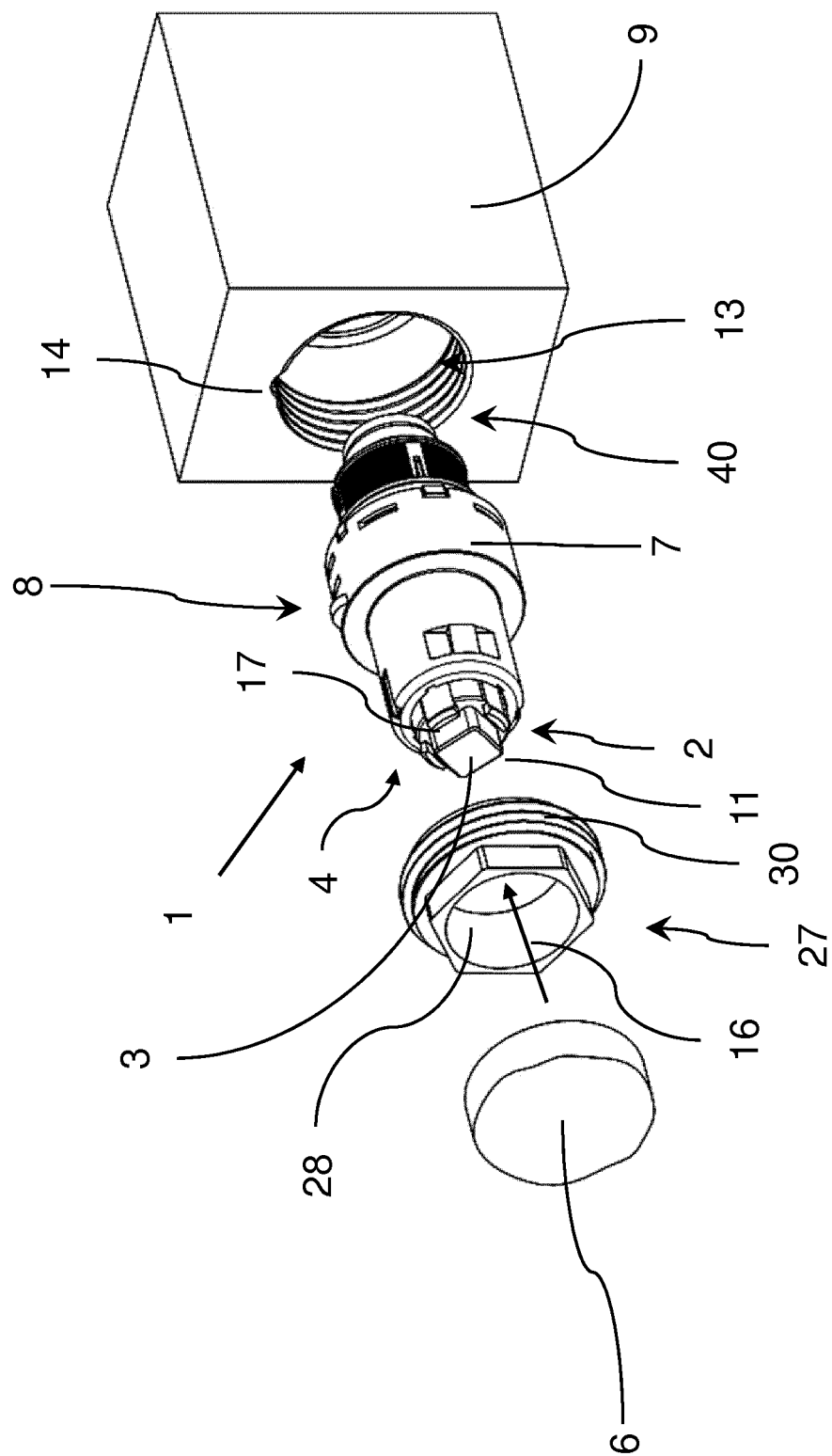
FIG. 1 shows a three-dimensional perspective view in an exploded illustration of a valve according to the invention with a covering cap, fastening element and part of a fitting.
Figure 2:
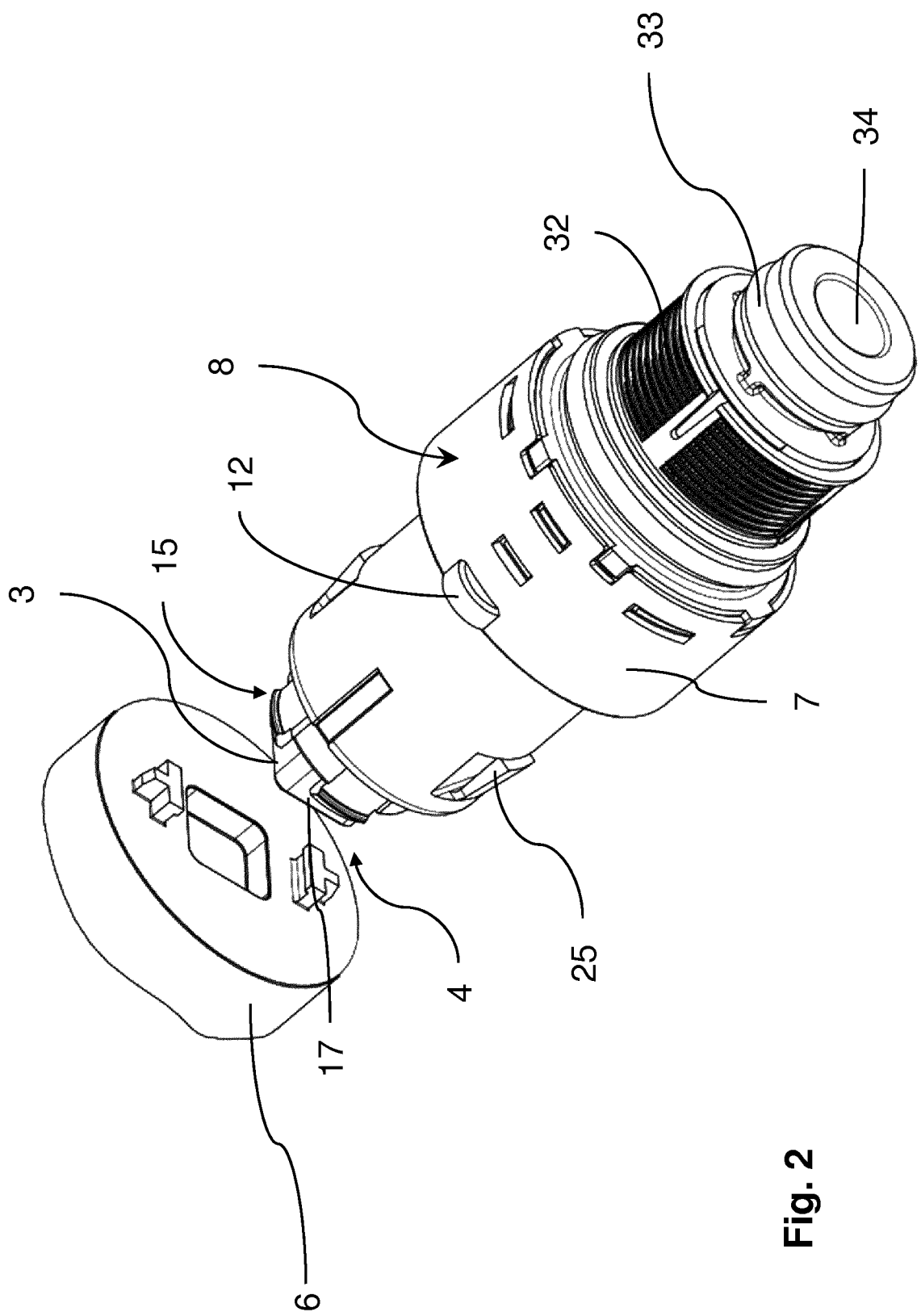
FIG. 2 shows the valve from FIG. 1 in a perspective view from below with an associated covering cap.

FIG. 1 shows a valve, which is denoted as a whole by 1. In a manner known per se, the valve 1 has in the interior a push-push actuation mechanism 2, which, in a manner known per se, allows the valve 1 to be switched between at least two switching positions, for example an open position and a closed position or multiple open positions with a different opening cross section, by repeated pressing of an actuation element 3.

A cap interface 5 is formed at the free end 4. As will be discussed in more detail, the cap interface 5 comprises a number of design elements which make possible a connection to a covering cap 6.

In this case, the covering cap 6 is of correspondingly complementary form on its side facing the free end 4.

The valve 1 furthermore has a main body 7 which is formed with a fitting interface 8. Said fitting interface 8 has, in a manner to be described in more detail, design elements which allow the valve 1 to be inserted into a correspondingly configured fitting 9 and to be fastened thereto.

In this case, the covering cap 6 serves for matching the appearance of the valve 1 to the outer appearance of the fitting 9.

The actuation element 3 is able to be displaced along an actuation direction 10 for execution of the push-push actuation.

In this case, a guide known per se from push-push actuation mechanisms serves for guiding said displacement movement in a rotationally fixed manner with respect to the actuation direction 10.

The cap interface 5 is geometrically formed in such a way that a correspondingly formed covering cap 6 is able to be mounted and connected to the actuation element 3 in four orientations, each of which can be realized by rotation through 90° about an axis defined by the actuation direction 10. This is achieved in that the cap interface 4 has discrete rotational symmetry of order four about the actuation direction 10.

Here, the fitting interface 8 is provided with a peripheral contour 11, which has substantially, for example apart from necessary roundings, the shape of a quadrangle or—in other exemplary embodiments—the shape of an n-gon.

In further exemplary embodiments, other types of rotational symmetry are realized, for example of order two, of order three, of order five or of order greater than five, in particular rotational symmetries whose degree of symmetry is characterizable by a number n divisible by four.

In the exemplary embodiment as per FIGS. 1 to 14, the fitting interface 8 is formed with a rotational symmetry which allows connection to the fitting 9 in a single orientation. This is achieved by a corresponding formation of a single positioning element 12 on the periphery of the main body 7, by which positioning element any rotational symmetry is broken. The positioning element 12 may for example be in the form of a lug or projection.

Figure 3:
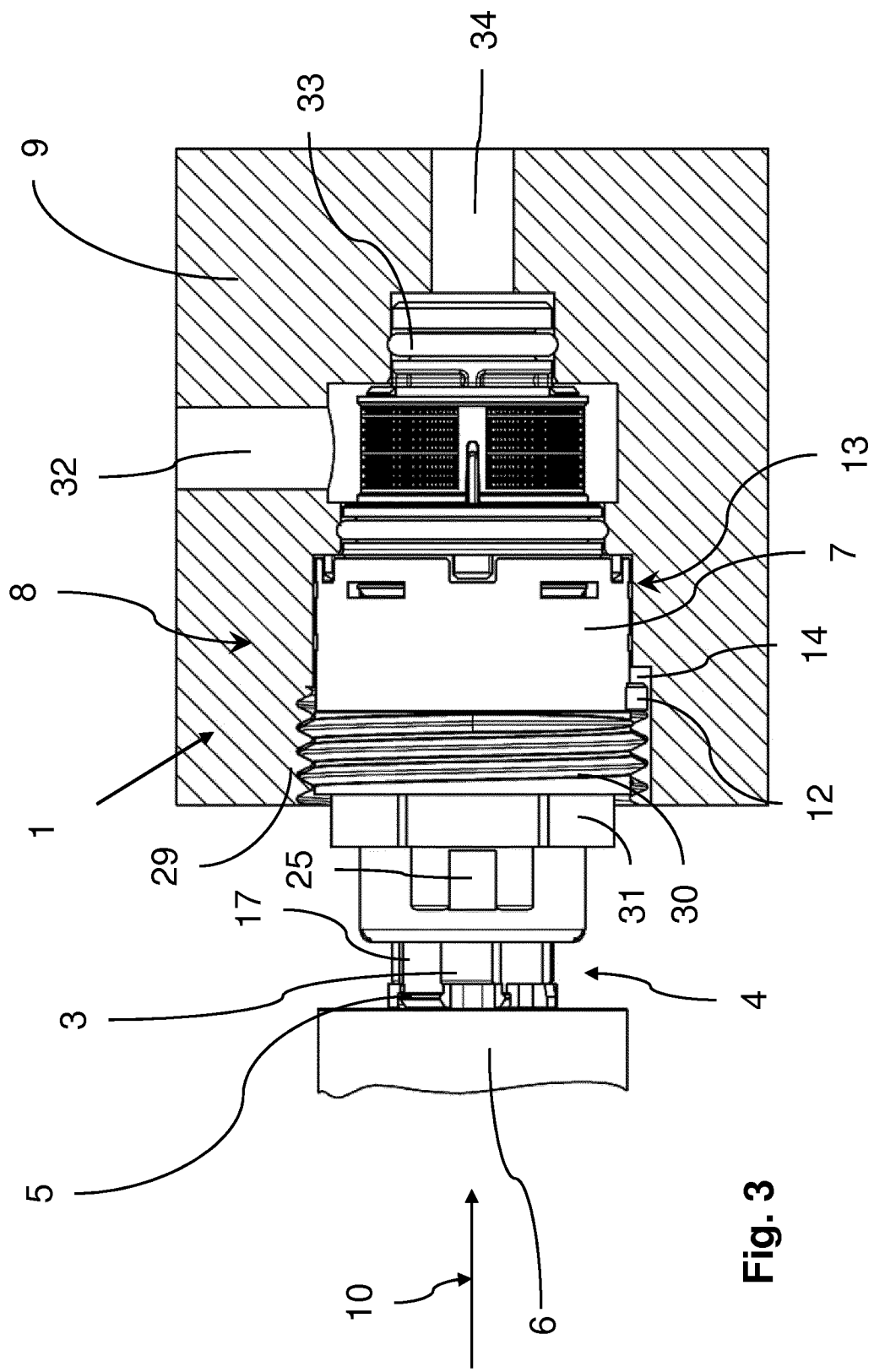
FIG. 3 shows a side view of the valve as per FIG. 1 in a fitted position, wherein a part of the fitting is shown in a sectional illustration, and wherein a part of the covering cap is shown.

It can be seen from FIG. 3 that the main body 7 of the valve 1 is placed into a valve receptacle 13 in the fitting 9. A positioning recess 14 which matches the positioning element 12 is formed in the valve receptacle 13. Consequently, the valve 1 fits into the valve receptacle 13 in exactly one orientation. The positioning recess 14 in the valve receptacle 13 thus forms a fitting counterpart interface 40.

Through the formation of the described symmetry at the cap interface 5, it can thus be achieved that the covering cap 6 is able to be positioned in a multiplicity of orientations without the valve receptacle 13 having to differ significantly from a round inner contour. The valve receptacle 13, which is generally formed in a metallic fitting 9, can therefore be produced using simple manufacturing methods. Reworking is required only to a small extent, for example for introducing the positioning recess 14.

The cap interface 5 has a means for forming a snap-action and/or latching connection 15. This serves for fastening the covering cap 6 on the free end 4.

Figure 5:
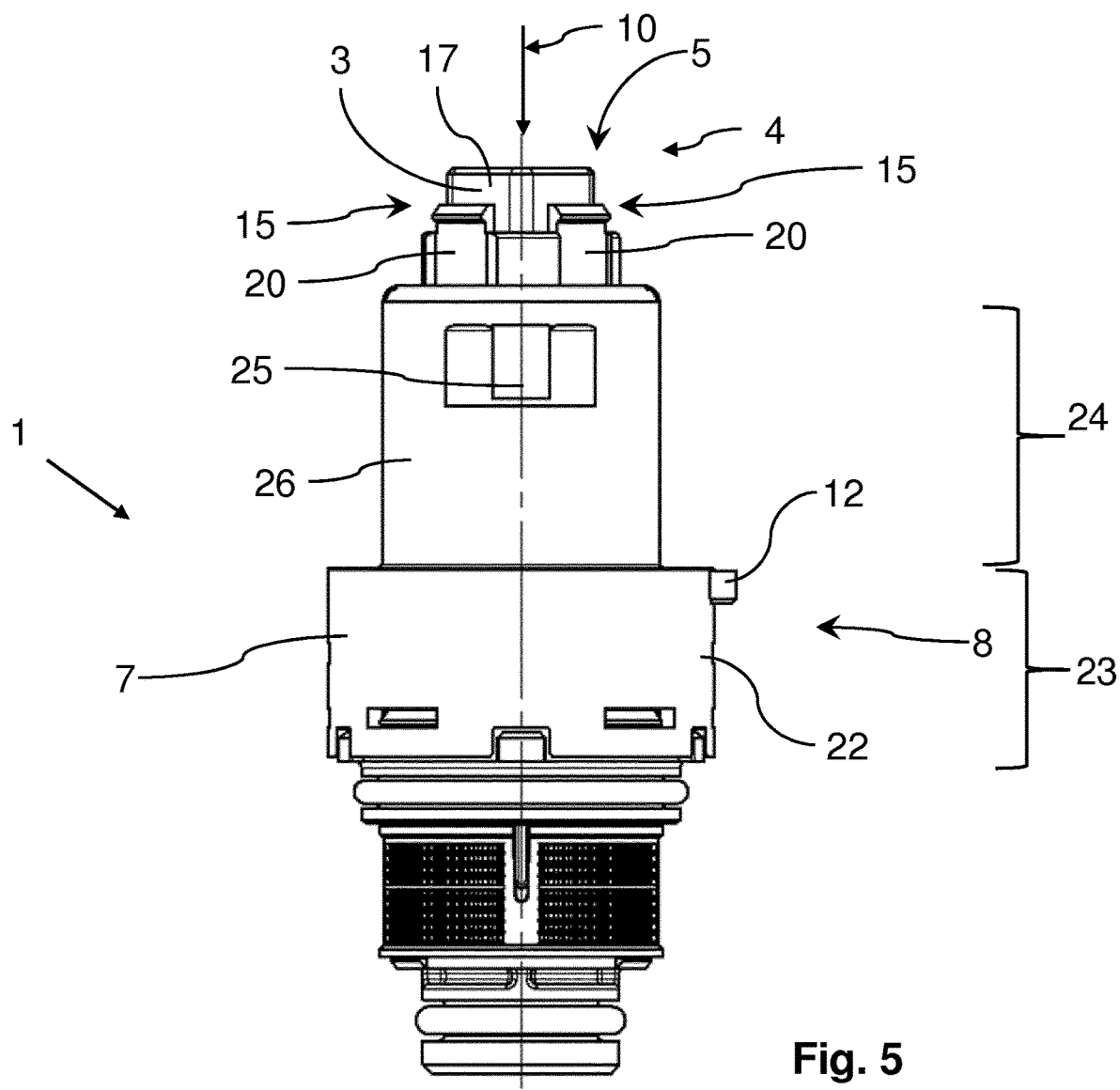
FIG. 5 shows a side view of the valve as per FIG. 1.
Figure 8:
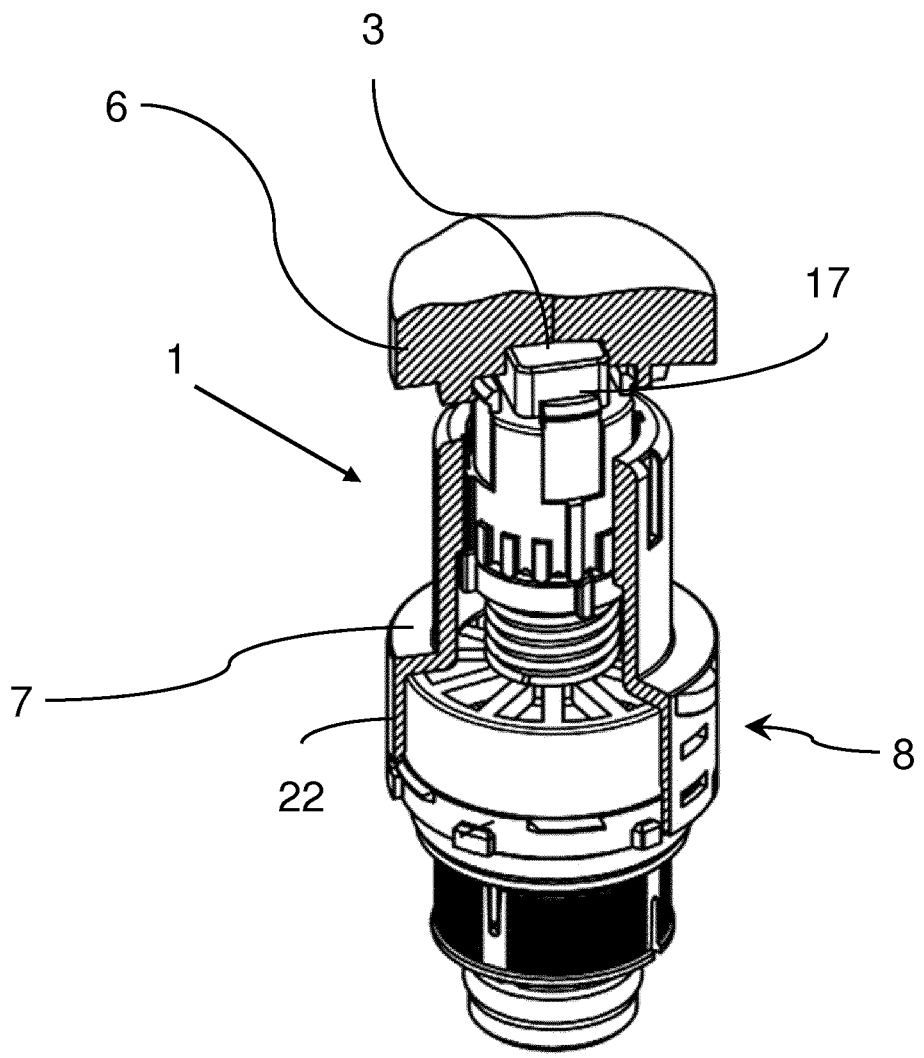
FIG. 8 shows a partially cut-away illustration of the valve as per FIG. 1 with a mounted covering cap (cut away)
Figure 9:
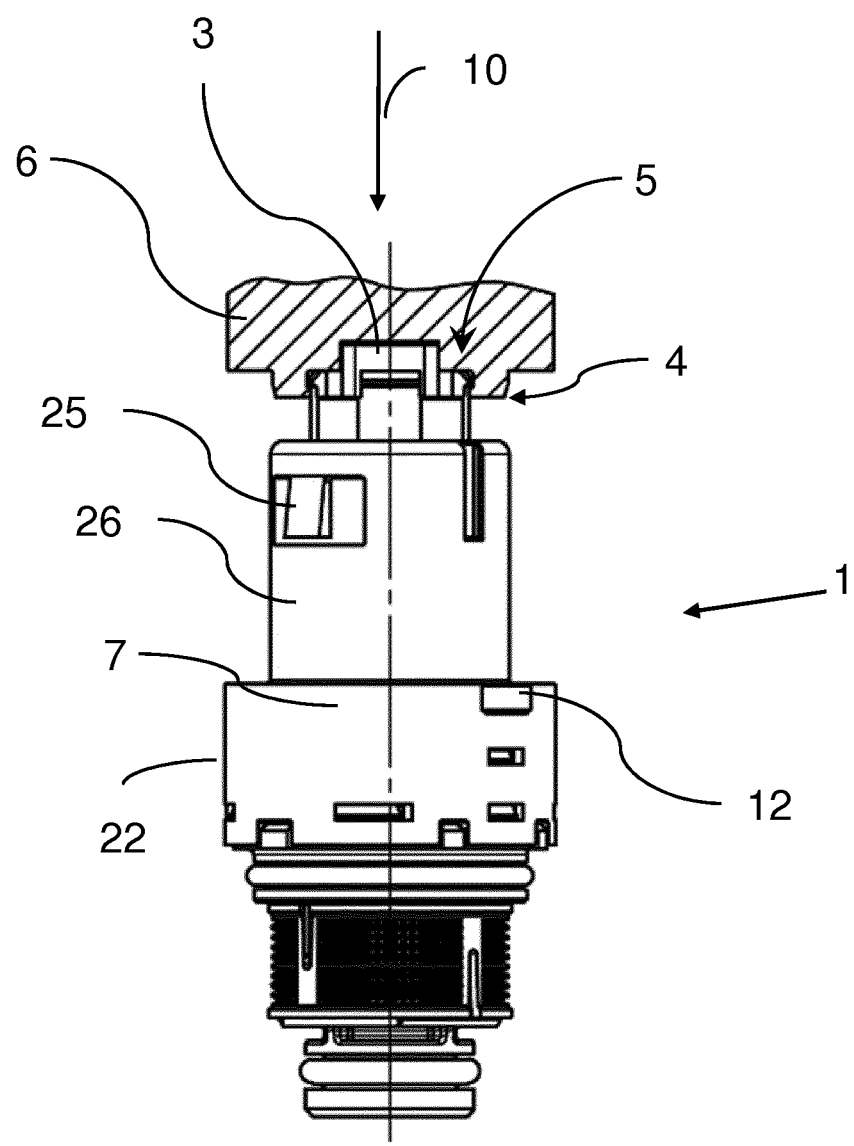
FIG. 9 shows a side view of the valve as per FIG. 1 with a mounted covering cap (axially cut away)
Figure 10:
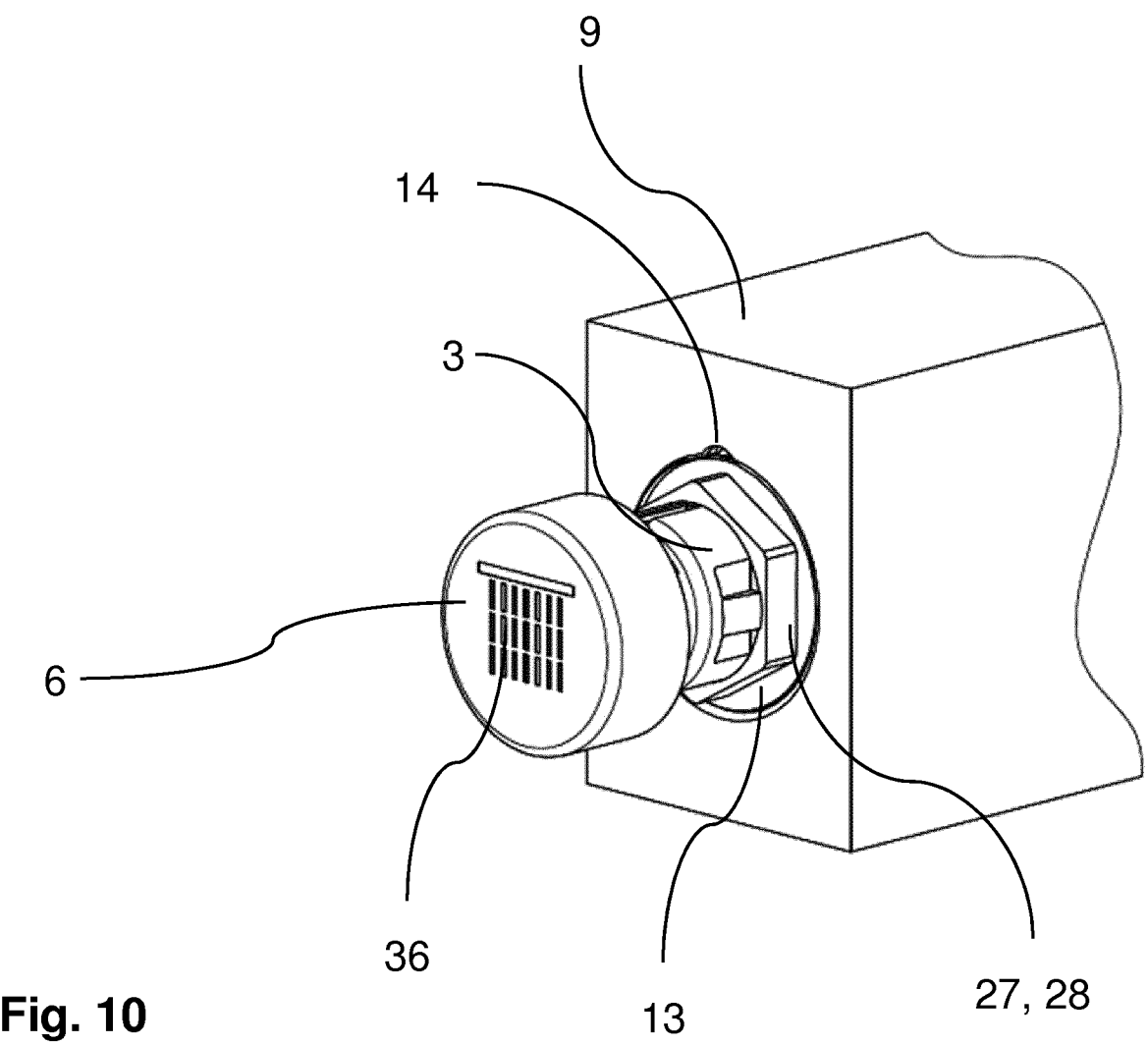
FIG. 10 shows the fully assembled arrangement from FIG. 1 with exemplary printing.
Figure 13:
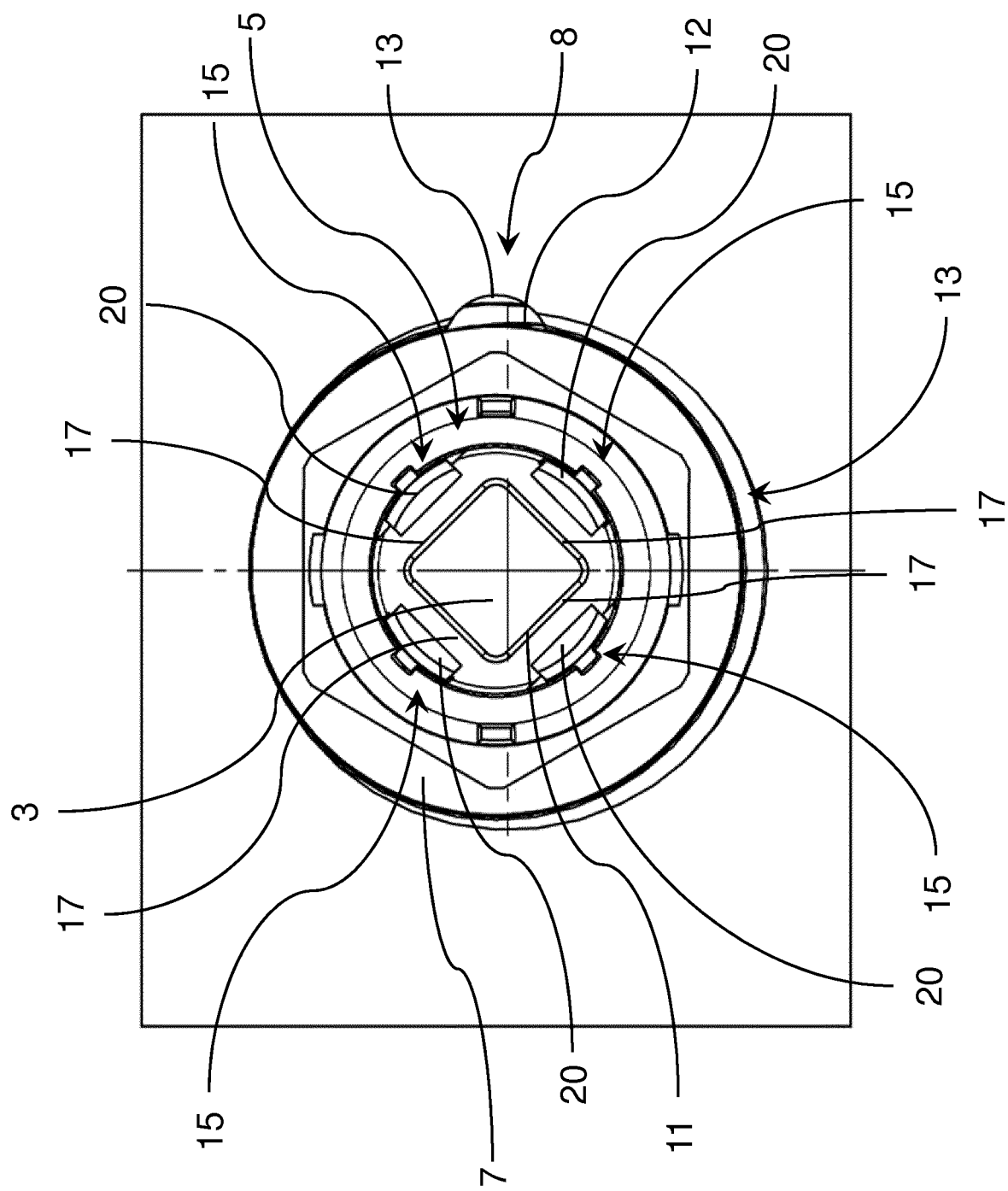
FIG. 13 shows a view of the valve as per FIG. 1 with the covering cap removed.

In FIG. 5, it can seen that the means for forming a snap-action and/or latching connection 15 is arranged so as to be situated beyond the start of the peripheral contour 11, by way of which a means for rotationally fixed guidance 17 of the covering cap 6 is formed, in a plugging-on direction 16. The guidance is a result of the peripheral contour 11 being continued in the plugging-on direction 16 such that surfaces extending parallel to the plugging-on direction 16 are formed. The cap counterpart interface 21 has corresponding surfaces, which interact with these surfaces.

In this way, it is achieved that the covering cap 6 comes into contact with the means for rotationally fixed guidance 17 first of all. Further pushing of the covering cap 6 onto the actuation element 3 causes the covering cap 6 to latch onto the free end 4.

In FIGS. 6 to 9, it can be seen that the covering cap has a recess 18. The recess 18 matches the peripheral contour 11 of the free end 4 in such a way that the covering cap 6 is guided on the free end 4 in a rotationally fixed manner but so as to be displaceable in the plugging-on direction 16.

Latching undercuts 19 are formed on the covering cap 6 and engage with latching springs 20 of the means for forming a snap-action and/or latching connection 15. The latching springs 20 are each composed of a spring element 38 and a latching lug 39, or each have these.

The recess 18 and the latching undercuts 19 thus form a cap counterpart interface 21, which matches the cap interface 5. The symmetry of the cap counterpart interface 21 may in this case be formed to be identical to that of the cap interface 5 or to be compatible therewith (for example of order two).

On the main body 7, a section with a cylindrical basic shape 22 is formed as an insertion section 23, onto which the positioning element 12 is fitted. Said insertion section 23 fits into the valve receptacle 14. Formed ahead of this insertion section 23 is a fastening section 24, which bears retaining lugs 25 on a housing part 26.

Mounted onto the housing part 26 for the purpose of assembly is a fastening element 27, a fastening nut 28 in this case, which is held captively in its position by the retaining lugs 25.

The fastening element 27 is screwed into a thread 30 of the valve receptacle 13 by way of a counterpart thread 29 in order to fix the valve 1. In this way, the valve 1 itself does not have to be rotated, and the orientation of a mounted covering cap 6 is maintained with respect to the fitting 9. On the peripheral side of the fastening element 27, there is formed a tool engagement point 31, for example a hexagonal head, for achieving firm retention of the valve 1.

As can be seen in FIG. 3, the valve 1 closes a connection between an inlet 32 and an outlet 34 or opens said connection. A seal 33 between the inlet 32 and the outlet 34 prevents leakage flows when the valve 1 is closed.

Figure 4:
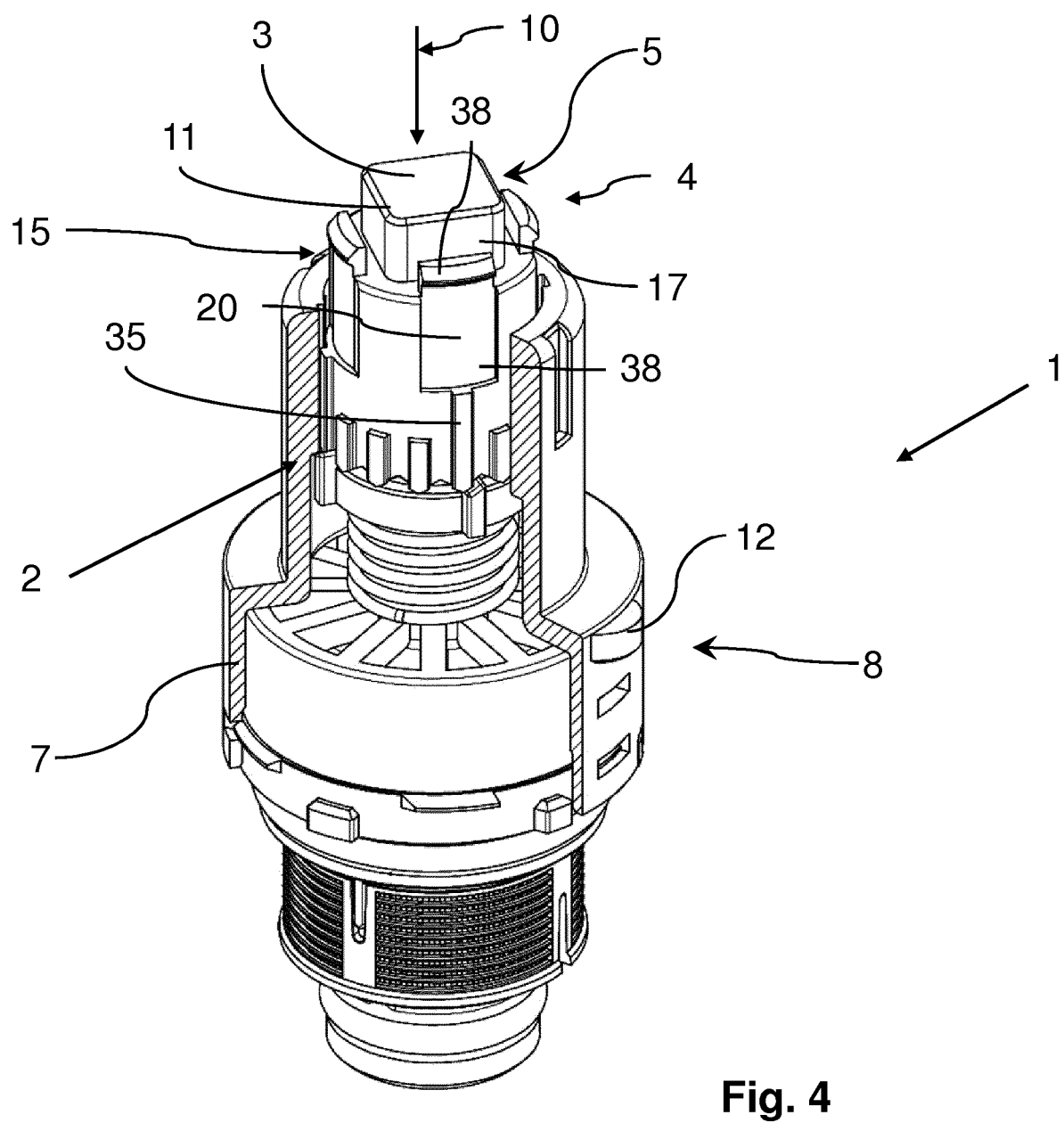
FIG. 4 shows a partially cut-away perspective view of the valve as per FIG. 1.

FIG. 4 illustrates guide elements 35 of a push-push actuation mechanism 2, which is known per se. Said guide elements 35 cause the actuation element 3, and consequently a covering cap 6 latched thereto, to be guided in a rotationally fixed manner and so as to be displaceable in the actuation direction 10.

Figure 14:
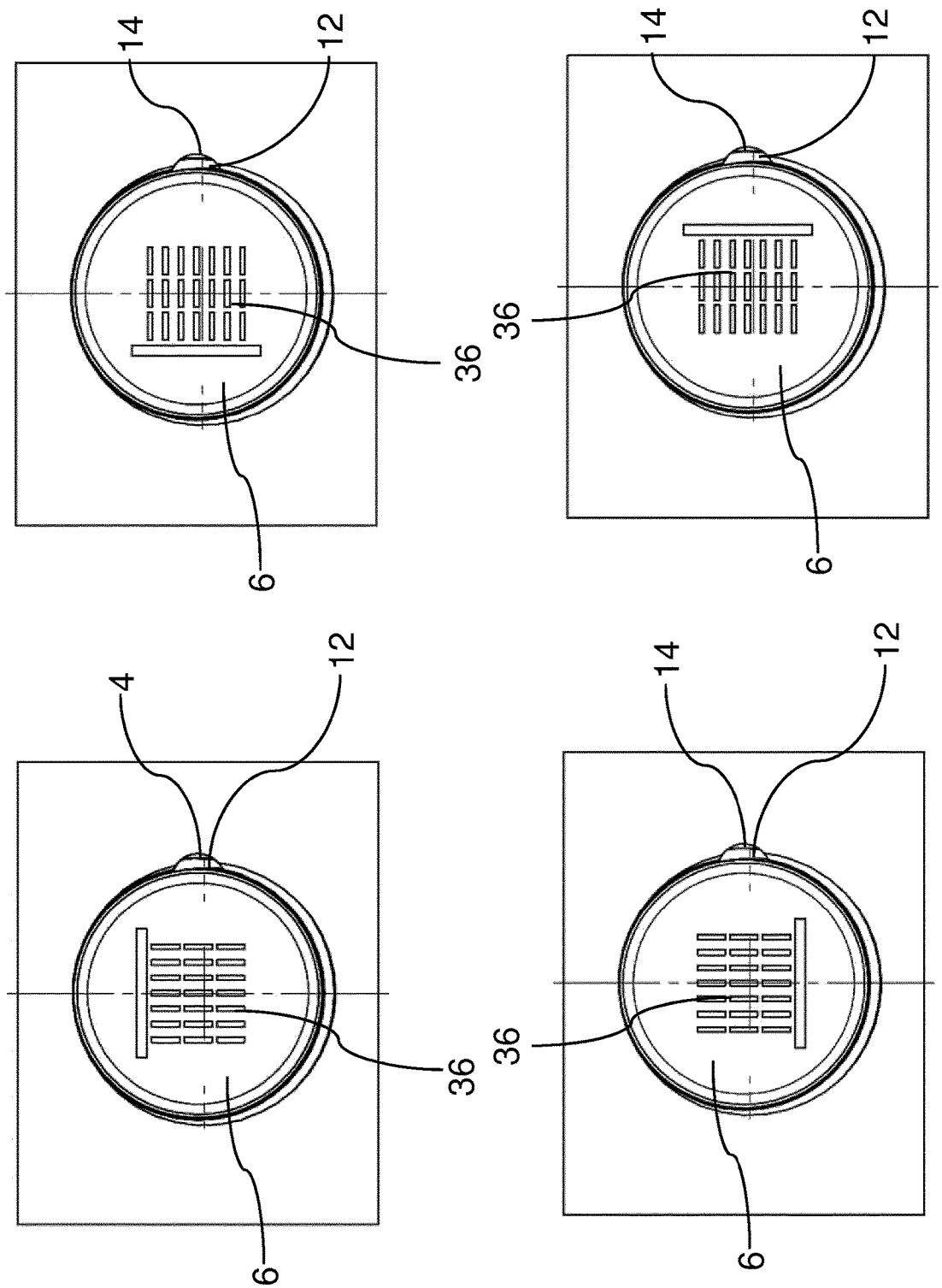
FIG. 14 shows different orientations in which the covering cap is able to be mounted onto the valve as per FIG. 1.

It is thus possible, as illustrated in FIG. 14, for a marking 36 on the covering cap 6 to be permanently oriented in four different orientations, and in n different orientations in further exemplary embodiments, with respect to the fitting 9. Consequently, irrespective of the installation situation of the fitting 9, the marking 36 can always be oriented such that a user can perceive it correctly.

Figure 15:
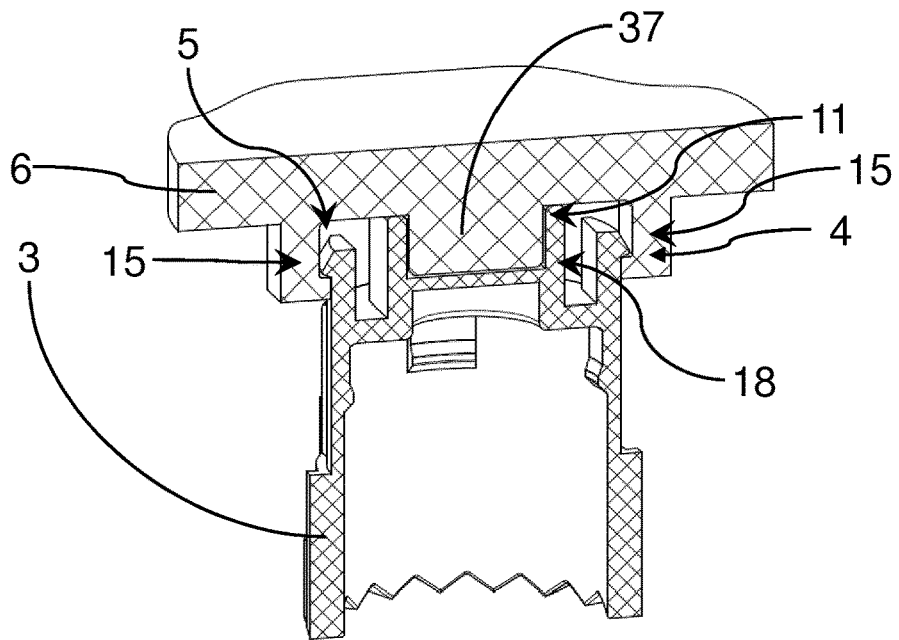
FIG. 15 shows a further example of a covering cap able to be used for the arrangement as per FIG. 1.
Figure 16:
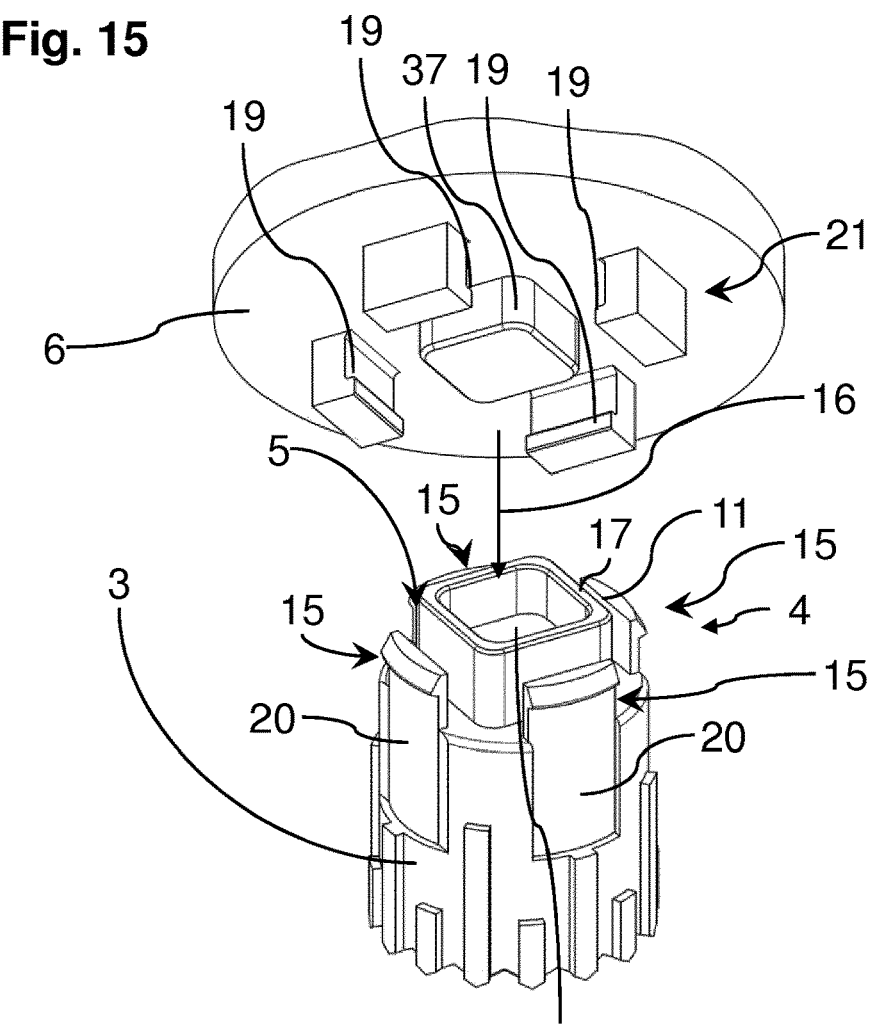
FIG. 16 shows the covering cap and the actuation element from FIG. 15 with a view of the cap counterpart interface of the covering cap and of the cap interface of the actuation element.

FIGS. 15 and 16 show a further exemplary embodiment of the invention. Components and functional units which are similar or identical in terms of construction and/or function are denoted by the same reference signs and will not be described separately again. The statements relating to FIGS. 1 to 14 therefore apply correspondingly to FIGS. 15 and 16.

The exemplary embodiment as per FIGS. 15 and 16 differs from the preceding exemplary embodiment in that the cap counterpart interface 21 is also of order four, whereas this was of order two in the preceding exemplary embodiment. This achieves firmer retention of the covering cap 6 on the free end 4.

The exemplary embodiment as per FIGS. 15 and 16 also differs from the preceding exemplary embodiment in that, on the covering cap 6, there is formed an elevation 37, which is inserted into a recess 18 in the free end 4 of the actuation element 3. Here, the peripheral contour 11, by way of which the rotationally fixed connection between the covering cap 6 and the actuation element 3 is established, is formed as an inner contour, whereas it is formed as an outer contour in FIGS. 1 to 14.

Figure 17:
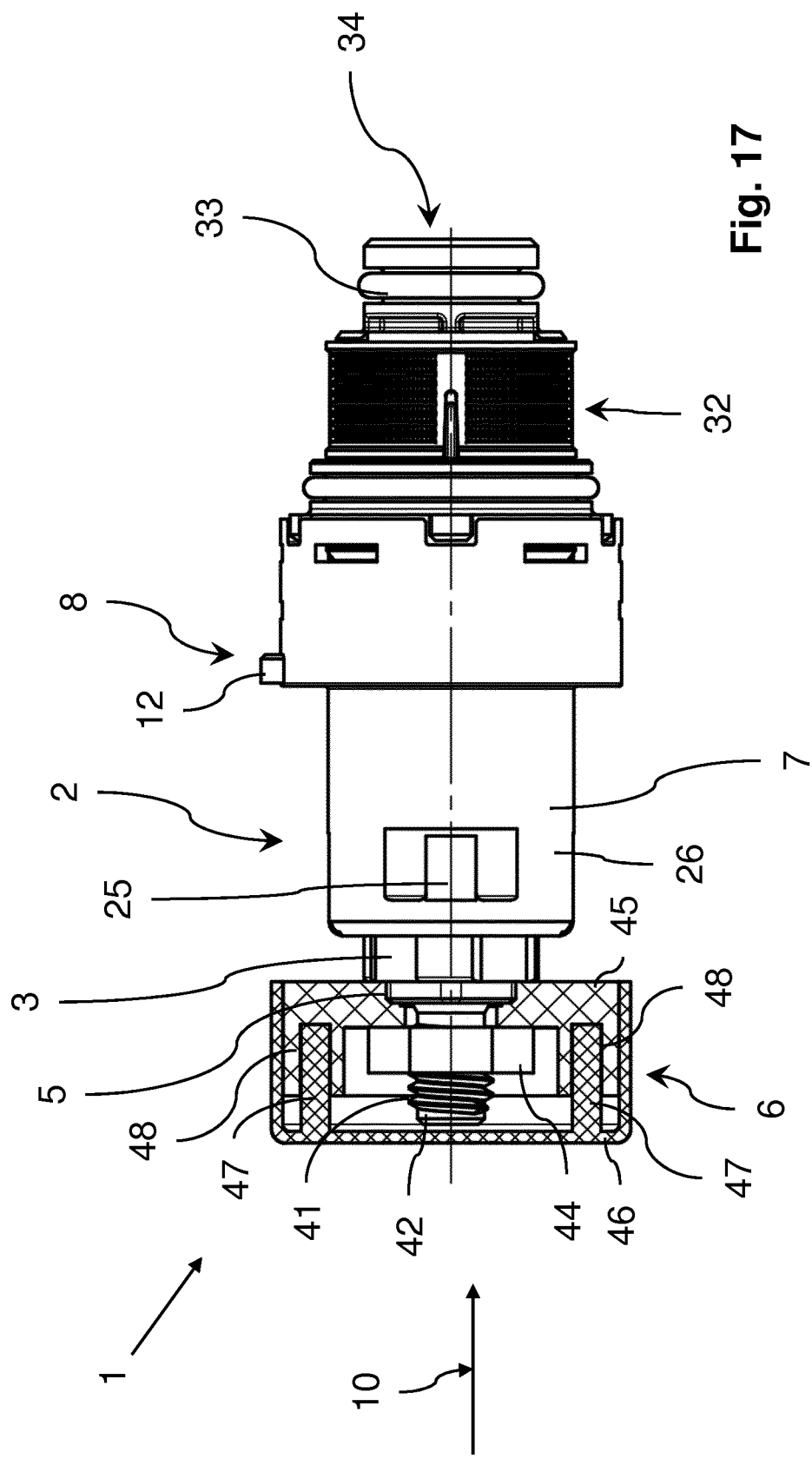
FIG. 17 shows a further valve according to the invention with an attached covering cap (partially cut away)
Figure 18:
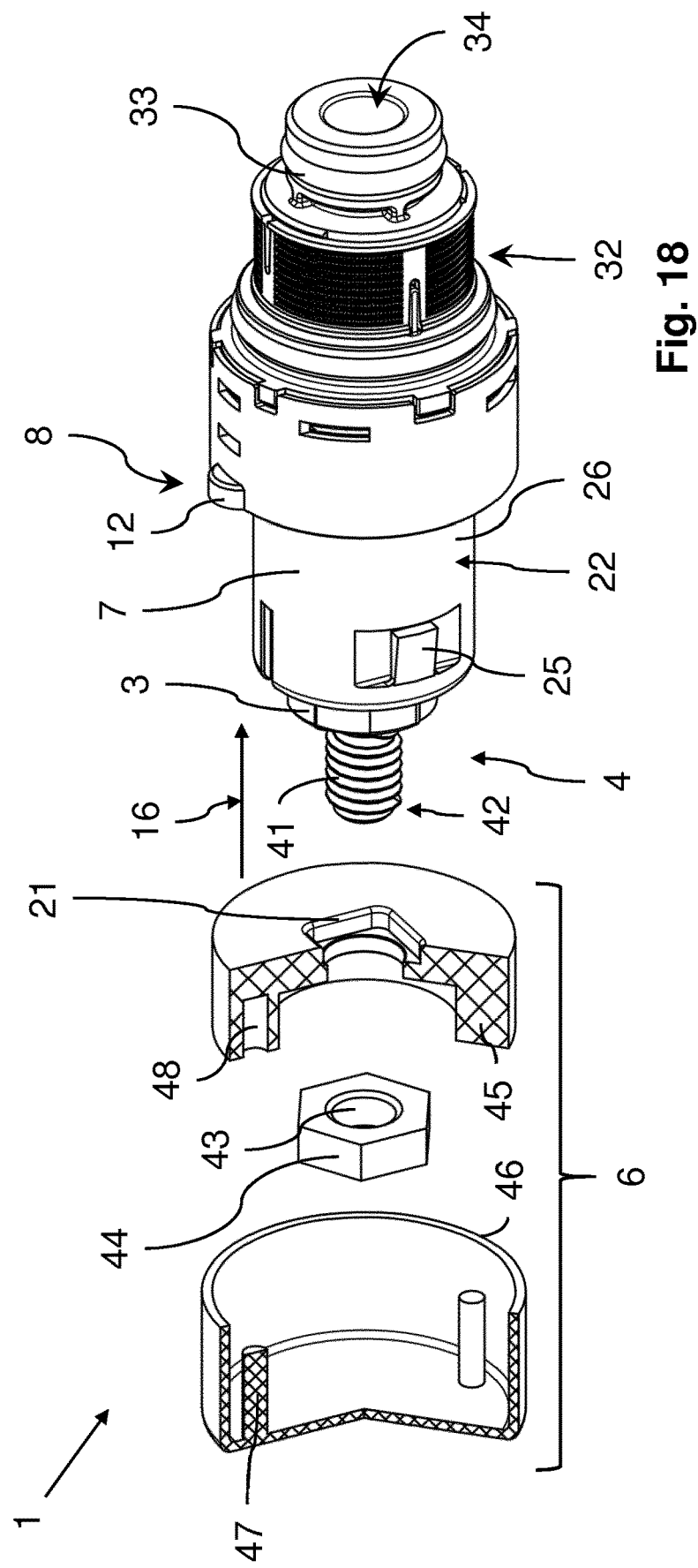
FIG. 18 shows the valve from FIG. 17 with a covering cap in a three-dimensional perspective view with a view directed counter to an insertion direction of the valve.
Figure 19:
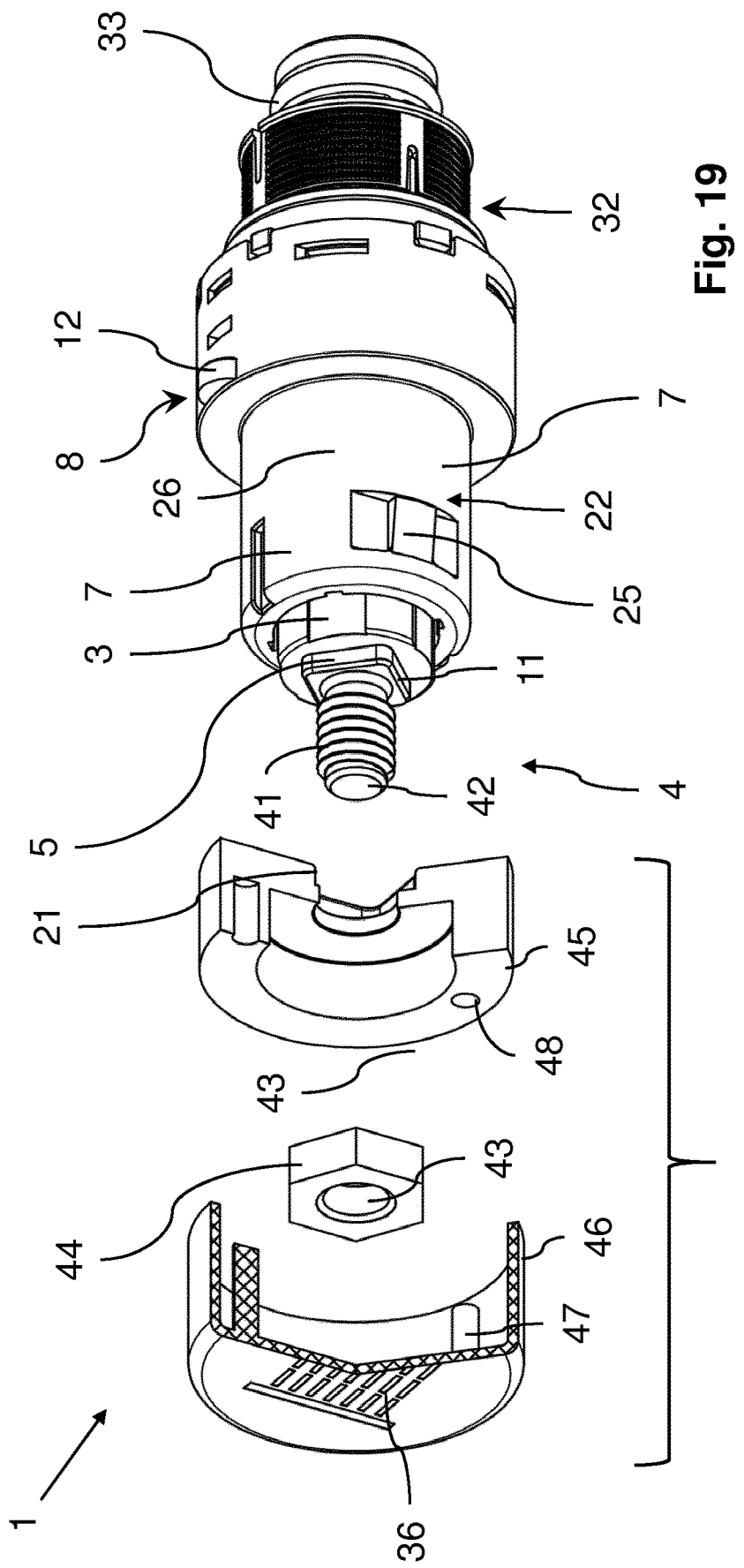
FIG. 19 shows the valve from FIG. 17 with a covering cap in a three-dimensional perspective view with a view of the covering cap along an insertion direction of the valve.

FIGS. 17 to 19 show a further exemplary embodiment of the invention. Components and functional units which are similar or identical in terms of construction and/or function are denoted by the same reference signs and will not be described separately again. The statements relating to FIGS. 1 to 16 therefore apply correspondingly to FIGS. 17 to 19.

The exemplary embodiment as per FIGS. 17 to 19 differs from the preceding exemplary embodiment in that no latching connection is formed between the actuation element 3 and the covering cap 6.

Rather, in this variant, a thread 41 is formed on the actuation element 3. Said thread 41 is arranged on a threaded bolt 42, and can be screwed together with a counterpart thread 43 on a retaining nut 44.

Since the threaded bolt 42 is arranged ahead of the cap interface 5, the threaded bolt 42 can be inserted through a cap base piece 45, fixed by the retaining nut 42 and concealed behind a cover 46.

At least one pin 47—two pins 47 in this case—on the cover 46 and at least one—two in this case—matching pin receptacles 48 in the cap base piece 45 form a rotation-prevention means. In further exemplary embodiments, said rotation-prevention means is formed in another way, for example through design of corresponding contours and/or through a form-fitting, force-fitting and/or materially bonded connection between the cover 46 and the cap base piece 45.

In a further exemplary embodiment (not illustrated), the actuation element is of multi-part design and comprises the parts 3 and 45 illustrated in FIGS. 17 to 19. The covering cap is formed by the part 46, and the cap interface 5 is realized by the pin receptacles 48. With the two pin receptacles 48, a rotational symmetry of 180°, that is to say n=2, is established. Higher values of n are achieved through a larger number (n) of uniformly distributed pin receptacles 48. The pins 47 define the cap counterpart interface 21. The contours of the details 5 and 21 may in this case be formed such that a connection is possible in only one orientation. Otherwise, the exemplary embodiment may be configured as in FIGS. 17 to 19.

For a sanitary valve 1 having a push-push actuation mechanism 2, it is therefore proposed to form a cap interface 5 between a covering cap 6 and an actuation element 3 with greater rotational symmetry than a fitting interface 8 between the valve 1 and a fitting 9.

LIST OF REFERENCE SIGNS

1 Valve
2 Push-push actuation mechanism
3 Actuation element
4 Free end
5 Cap interface
6 Covering cap
7 Main body 8 Fitting interface
9 Fitting
10 Actuation direction
11 Peripheral contour
12 Positioning element
13 Valve receptacle
14 Positioning recess
15 Means for a snap-action and/or latching connection
16 Plugging-on direction
17 Means for rotationally fixed guidance
18 Recess
19 Latching undercut
20 Latching spring
21 Cap counterpart interface
22 Cylindrical basic shape
23 Insertion section
24 Fastening section
25 Retaining lug
26 Housing part
27 Fastening element
28 Fastening nut
29 Counterpart thread
30 Thread
31 Tool engagement point
32 Inlet
33 Seal
34 Outlet
35 Guide element
36 Marking
37 Elevation
38 Spring element
39 Latching lug
40 Fitting counterpart interface
41 Thread
42 Threaded bolt
43 Counterpart thread
44 Retaining nut
45 Cap base piece
46 Cover
47 Pin
48 Pin receptacle

The invention claimed is:

1. A valve (1), comprising:
a push-push actuation mechanism (2) which has an actuation element (3) which, at a free end (4) thereof, forms a cap interface (5) for a covering cap (6);
a main body (7) defines a fitting interface (8) for a fitting (9), the main body (7) includes an inlet (32) and includes an outlet (34) in a first end region;
the actuation element (3) is guided in a manner rotationally fixed relative to the main body (7) and so as to be displaceable in an actuation direction (10), and the free end (4) extends out from an end of the main body (7) opposite from the first end region;
the cap interface (5) is formed such that the covering cap (6) is connectable in n orientations; and
the fitting interface (8) is formed such that the main body (7) is adapted to be inserted into the fitting (9) in m orientations, and n>m.

2. The valve (1) as claimed in claim 1, wherein at least one of the cap interface (5) has rotational symmetry of order n, or the fitting interface (8) has rotational symmetry of order m.

3. The valve (1) as claimed in claim 1, wherein the cap interface (5) has an n-gonal peripheral contour (11).

4. The valve (1) as claimed in claim 3, wherein n is a number divisible by four.

5. The valve (1) as claimed in claim 1, wherein the fitting interface (8) has a positioning element (12) by which the fitting interface is adapted to be inserted into a correspondingly shaped valve receptacle (13) of the fitting (9) in exactly one orientation.

6. The valve (1) as claimed in claim 1, wherein the cap interface (5) is configured for forming at least one of a snap-action or latching connection.

7. The valve (1) as claimed in claim 6, wherein the latching connection includes at least one of a latching lug formed on a spring element or a latching undercut (19).

8. The valve (1) as claimed in claim 6, wherein the at least one of the snap-action or latching connection (15) is, in a plugging-on direction (16) arranged beyond a rotationally fixed guidance (17).

9. The valve (1) as claimed in claim 1, wherein, on the main body (7), a fastening element (27) is configured for fastening to the fitting (9) and is arranged so as to be movable relative to the main body (7).

10. The valve (1) as claimed in claim 1, wherein the fitting interface (8) is formed without a thread.

11. A fitting (9) with a covering cap (6) and a valve (1) as claimed in claim 1, wherein the covering cap (6) has a cap counterpart interface (21) which is configured for matching the cap interface (5), the fitting (9) has a fitting counterpart interface (40) which is configured for matching the fitting interface (8), or the covering cap (6) has a cap counterpart interface (21) which is configured for matching the cap interface (5) and the fitting (9) has a fitting counterpart interface (40) which is configured for matching the fitting interface (8).

12. The fitting (9) as claimed in claim 11, the fitting (9) is produced from metal and the covering cap (6) is produced from at least one of plastic or metal.

13. The fitting (9) as claimed in claim 11, wherein the fitting (9) has a valve receptacle (13) into which the main body (7) of the valve (1) is inserted.

14. The valve (1) as claimed in claim 13, wherein the main body (7) of the valve, is inserted into the valve receptacle (13) in a rotationally fixed manner.

15. A method of using the valve (1) as claimed in claim 1, comprising:
inserting the valve (1) into a fitting (9) in an orientation of the main body; and
mounting a covering cap (6) onto the actuation element (3) in an orientation of the cap with respect to printing on the covering cap (6).

16. The method of claim 15, wherein at least one of the orientation of the cap or the orientation of the main body is selected such that the covering cap (6) has a desired spatial orientation in a position of use.

17. The valve (1) as claimed in claim 1, wherein a thread (41) is formed on the actuation element (3), and is arranged ahead of the cap interface (5) in a plugging-on direction.

18. The valve (1) as claimed in claim 1, wherein the main body (7) has a cylindrical basic shape (22) at least in the region of the fitting interface (8).

* * * * *